United States Patent [19]

Fourrey et al.

[11] Patent Number: 5,590,931
[45] Date of Patent: Jan. 7, 1997

[54] ARTICULATION HAVING A MEMORY OF AN ADJUSTMENT POSITION FOR A SEAT STRUCTURE

[75] Inventors: Francois Fourrey; Sylvain Rager, both of Nogent sur Vernisson, France

[73] Assignee: CESA-Compagnie Europeenne de Sieges pour Automobiles, Levallois-Perret Cedex, France

[21] Appl. No.: 466,198

[22] Filed: Jun. 6, 1995

[30] Foreign Application Priority Data

Jul. 5, 1994 [FR] France .................................. 94 08297

[51] Int. Cl.6 .................................................. B60N 2/02
[52] U.S. Cl. .......................................... 297/366; 297/367
[58] Field of Search ..................................... 297/366, 367, 297/368, 369

[56] References Cited

U.S. PATENT DOCUMENTS

| 3,953,069 | 4/1976 | Tamura et al. . | |
| 3,958,828 | 5/1976 | Ishida et al. | 297/367 |
| 4,087,885 | 5/1978 | Gillentine | 297/367 |
| 4,997,223 | 3/1991 | Croft | 297/367 |

FOREIGN PATENT DOCUMENTS

| 1347823 | 11/1963 | France . | |
| 2463596 | 2/1981 | France . | |
| 2494574 | 5/1982 | France | 297/367 |
| 1530519 | 8/1969 | Germany | 297/366 |
| 3319593 | 12/1983 | Germany . | |
| 3521730 | 12/1985 | Germany . | |
| 2117440 | 10/1983 | United Kingdom . | |
| 2241884 | 9/1991 | United Kingdom . | |

OTHER PUBLICATIONS

Patent Abstracts of Japan, vol. 15, No. 302 (C–0855), Aug. 2, 1991 & JP–A–03 112 507 (Aisin Seiki).

*Primary Examiner*—Peter R. Brown
*Assistant Examiner*—Anthony D. Barfield
*Attorney, Agent, or Firm*—Sughrue, Mion, Zinn, Macpeak & Seas

[57] ABSTRACT

The articulation comprises a fixed plate (10), a movable plate (20), an intermediate plate (30), an inclination adjusting mechanism (40), a lock (50) for locking the swinging motion, and a movable control device (60) acting on the mechanism (40) and the lock (50) in such manner as to, at will, shift either the mechanism or the lock from an engaged position to a disengaged position so that the intermediate plate (30) is coupled with both the fixed plate and the movable plate or only with one or the other of the fixed plate and movable plate. Application in particular in vehicle seat structures of which the backrest is inclinable and capable of being swung over toward the seat.

11 Claims, 4 Drawing Sheets

ARTICULATION HAVING A MEMORY OF AN ADJUSTMENT POSITION FOR A SEAT STRUCTURE

BACKGROUND OF THE INVENTION

The present invention relates to seat structures and more particularly to an articulation having a memory of an inclination adjustment position for a seat structure comprising in particular a seat and a backrest which are relatively movable in rotation about at least one axis.

In many industrial fields and for many uses seat structures are employed which comprise in particular a seat and a backrest relatively movable in rotation about at least one axis so as to make it possible to, at will, either progressively incline the backrest relative to the seat to give it a chosen position of adjustment or swing over the backrest for example toward or against the seat and inversely, to a swung over position or to a raised position respectively.

Such seats are employed in particular on tourist motor vehicles, in particular of the "coupé", "convertible" or even saloon type which are provided with only two lateral doors, one on each side of the vehicle. Such vehicles require front seat structures which are either both inclinable at will in accordance with the wishes of their occupants for the comfort of the latter, or retractable in particular by swinging the backrest over toward the seat to facilitate access to whatever is at the rear of the seat structure.

Articulation arrangements for motor vehicle seat structures which allow a progressive, continuous or discontinuous adjustment of the inclination of the backrest relative to the seat are for example disclosed in the documents FR 2 463 596 and FR 2 541 950 and 2 547 778.

Articulation arrangements which permit swinging the backrest over toward the seat are for example disclosed in the documents FR 2 642 377 and FR 93 15 598. All these arrangements have the drawback of being cumbersome and requiring additional components relative to a more conventional articulation employed on saloons having four lateral doors, two per side.

A major drawback of complex articulations which permit both an adjustment of the inclination of the backrest and a swinging over of the backrest, resides in the fact that, upon the raising of the previously swung over backrest to cause it to pass from its swung over position to its raised position, the backrest does not systematically resume the chosen position of adjustment of the inclination it previously had before swinging over, whether this be due to the very design of the articulation or to a false manoeuvre on the part of the user. It is then necessary to effect a new adjustment or touch up the adjustment of the backrest to give the latter its initial position. Such an operation is tedious but is however essential when the seat structure in question is that of the driver.

SUMMARY OF THE INVENTION

An object of the invention is to overcome most of the previously briefly mentioned drawbacks with an articulation for a seat structure which is of great simplicity, in one unit, has a small overall size and comprises within a common case, preferably in the form of a substantially cylindrical barrel, the means required to adjust the progressive inclination of the backrest and the means required to swing over the backrest, with moreover a memory of the position of adjustment of the inclination of the backrest so that said position is immediately resumed and taken up when the previously swung over backrest is put back into its raised position.

This articulation is preferably modular and may be constructed with the swinging over means or without the latter, so that it may be used indifferently for seat structures of vehicles having one or two lateral doors per side of the vehicle.

The present invention provides an articulation having a memory of an inclination adjustment position which is for a seat structure comprising in particular a seat and a backrest relatively movable in rotation about at least one axis whereby it is possible to, at will, either progressively incline the backrest relative to the seat, or swing over the backrest toward the seat and inversely, to a swung over position or to a raised position respectively. This articulation comprises in particular a fixed plate with a cavity for fixing to one of said seat and backrest, a movable plate with a cavity for fixing to the other of said seat and backrest and wherein said cavities together define an inner chamber, is characterized in that it further comprises an intermediate plate which is placed in said chamber in such manner as to be rotatable therein about said axis, a mechanism for adjusting the inclination which is associated with said intermediate plate and is cooperative with said fixed plate and is movable between an engaged position in which said fixed and intermediate plates are coupled in rotation and a disengaged position in which said fixed and intermediate plates are relatively uncoupled in rotation to allow an adjustment of the inclination, a lock for locking the swinging over which is associated with said intermediate plate and cooperative with said movable plate and is movable between an engaged position in which said movable and intermediate plates are coupled in rotation and a disengaged position in which said movable and intermediate plates are relatively uncoupled in rotation to allow a swinging over and inversely, and a movable control device operative to act on said mechanism and said lock in such manner as to cause, at will, one or the other thereof to pass from its engaged position to its disengaged position whereby the intermediate plate is coupled to both the fixed and movable plates, or solely to one or the other of said fixed and movable plates.

Further features of the invention will be apparent from the following specification and claims and from the accompanying drawings given solely by way of example and in which:

DESCRIPTION OF A PREFERRED EMBODIMENT

Figure 1:
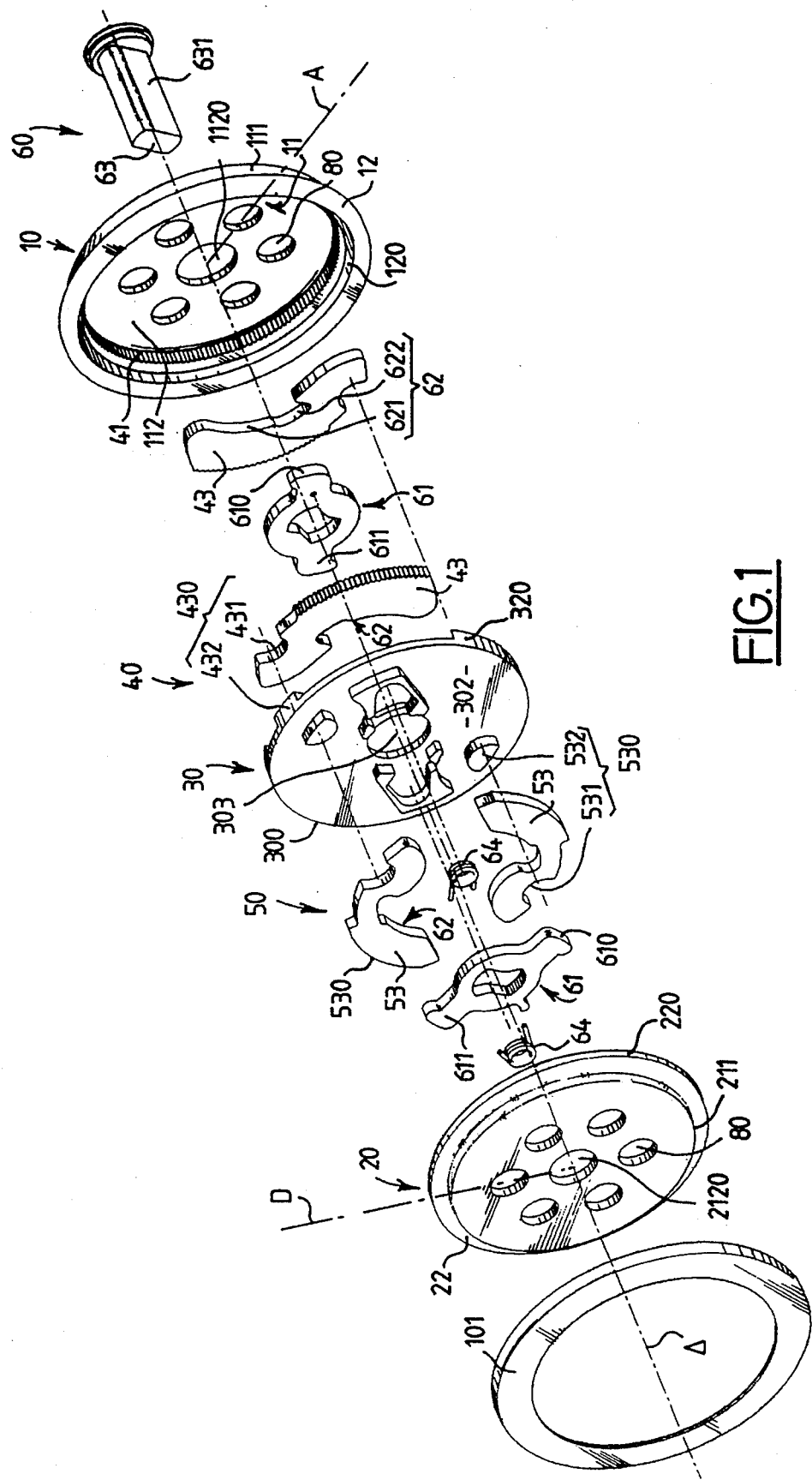
FIG. 1 is an exploded diagrammatic perspective view of an embodiment of an articulation according to the invention.
Figure 2:
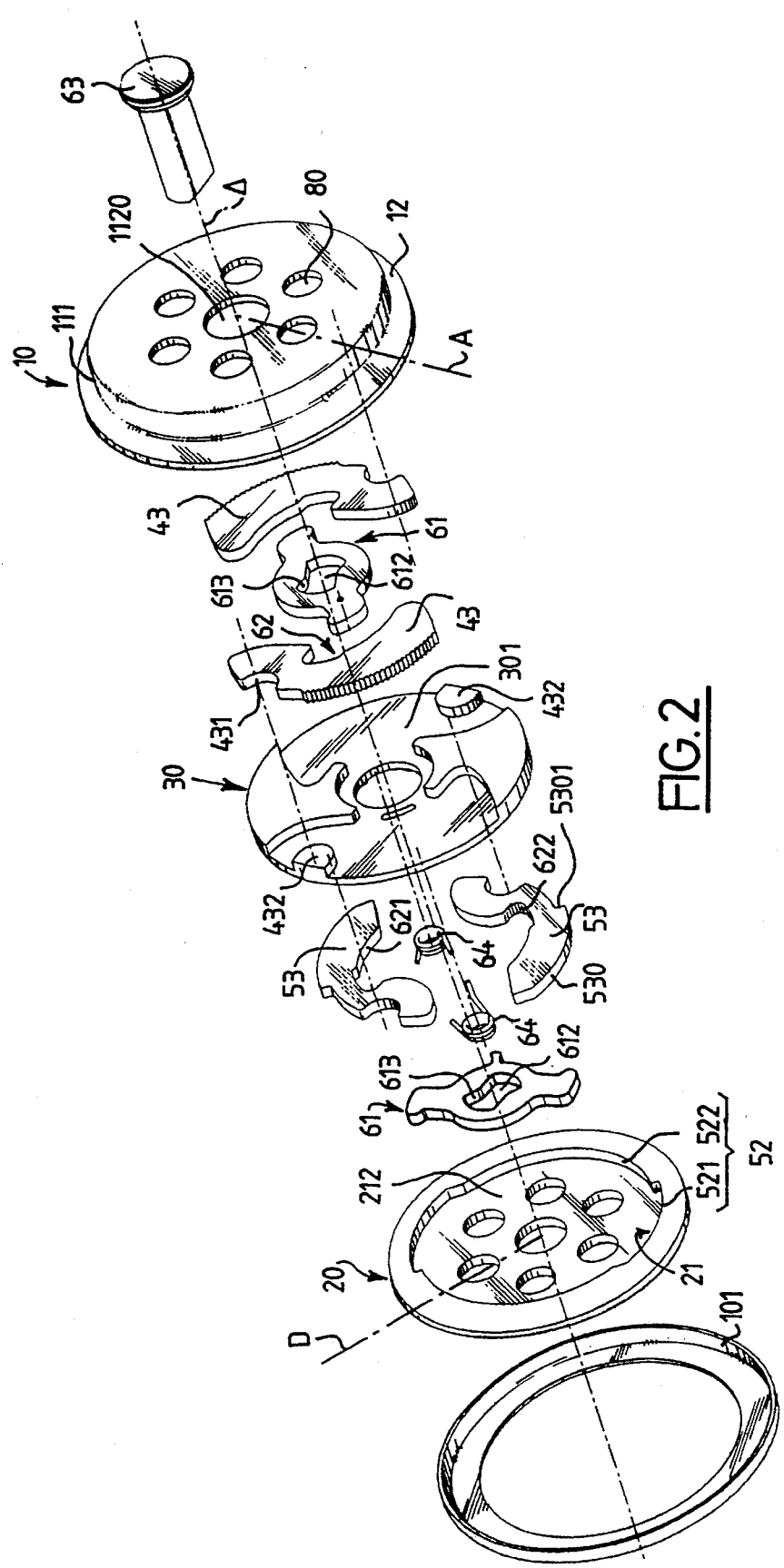
FIG. 2 is a view similar to that of FIG. 1 of this embodiment seen from a different angle.

As articulations for a seat structure comprising in particular a seat and a backrest relatively movable in rotation about at least one axis and in particular for those intended for ground motor vehicles, are well known in the art, only that which directly or indirectly concerns the invention will be described hereinafter. For the rest, one skilled in the art of the considered technical field will refer to conventional current solutions available to him for resolving particular problems he may meet. In particular, he may usefully refer to the aforementioned documents for further information.

Hereinafter, there will always be employed the same reference numeral to identify a homologous element, whatever be the embodiment or the variation thereof.

For convenience of the description, there will be described in succession each of the components of an improved articulation according to the invention before describing if need be the manufacture, the mounting and the operation thereof.

Hereinafter, an articulation according to the invention will be described in its application to a seat structure which is intended to be installed in a ground motor vehicle and comprises in particular a seat and a backrest of any conventional type—for this reason neither described nor illustrated—which are relatively movable in rotation about at least one axis Δ whereby it is possible to, at will, either progressively incline the backrest relative to the seat to an oblique position improving the comfort of the occupant, or swing over the backrest toward the seat and inversely to a swung over position facilitating access to whatever is at the rear of the seat structure or to a raised position allowing an occupant to be seated on the seat structure, respectively. In this particular case, the inclination axis and the swinging over axis are coincident and the seat A and the backrest D are shown symbolically by lines marked on the Figures of the drawing.

An articulation having a memory of the position of adjustment of the inclination according to the invention comprises mainly a fixed plate 10, a movable plate 20, an intermediate plate 30, a mechanism 40 for adjusting the inclination, a lock 50 for locking the swinging over, a control device 60 and preferably safety means 70. This articulation may also receive fixing means 80 for mounting each of the two fixed and movable plates, one on the seat and the other on the backrest of a seat structure.

As can be seen, the fixed plate 10 defines a cup-shaped cavity 11 for defining a chamber for reasons which will become apparent hereinafter. The cavity 11 is defined by an axial lateral wall 111 and an inner end wall 112 provided with a passage 1120 adapted to act as a bearing or to receive a bearing of any suitable conventional type for reasons which will become apparent hereinafter. Preferably, this fixed plate is provided with a flange 12 or the like for reasons which will become apparent hereinafter. The fixed plate also preferably includes at least one inner circular cylindrical surface 120 coaxial with the axis Δ, thereby constituting a guiding and centring arrangement for reasons which will become apparent hereinafter. The surface 120 is preferably arranged directly on a ledge of the fixed plate or, as the case may be, on an auxiliary mounting and assembling ring 101 which is adapted to be fixed preferably to the fixed plate, for example by a setting operation with the aid of a flange capable of being formed over or any other technique.

The movable plate 20 defines a cup-shaped cavity 21 so as to define a chamber for reasons which will become apparent hereinafter. The cavity is defined by an axial lateral wall 211 and by an end wall 212 provided with a through passage 2120 adapted to act as a bearing or receive a bearing, as mentioned before in respect of the fixed plate. Preferably, this movable plate is provided with a flange 22 having a circular cylindrical edge 220 coaxial with the axis Δ so as to constitute a guiding and centring arrangement, as indicated before in respect of the fixed plate.

The intermediate plate 30 is adapted to be placed in the chamber defined by the cavities 11 and 21 of the fixed plate 10 and movable plate 20 respectively. The intermediate plate 30 is in the form of a disc 300 with opposite faces 301 and 302 and with a circular cylindrical edge 320 coaxial with the axis Δ so as to constitute a guiding and centring arrangement, as indicated before in respect of the fixed and movable plates. The face 301 is placed in facing relation to the fixed plate 10 and the face 302 is placed in facing relation to the movable plate 20. This disc is provided with a central through opening 303.

The mechanism 40 for adjusting the inclination is associated with the intermediate plate 30 and is cooperative with the fixed plate 10. This mechanism is movable between an engaged position in which the fixed plate 10 and intermediate plate 30 are coupled in rotation, and a disengaged position in which the fixed plate 10 and intermediate plate 30 are uncoupled in rotation to allow an adjustment of the inclination. This mechanism 40 comprises teeth 41 carried by the axial lateral wall 111 of the cavity 11 of the fixed plate 10 and at least one movable toothed "block" or catch 43 cooperative with the teeth 41. The toothed block 43 is movably mounted on one of the faces 301, 302 of the intermediate plate 30 by guide means 430. These guide means 430 comprise in particular a bearing surface 431 preferably in the shape of a concave arc of a circular cylinder on the toothed block 43 and a pivot 432 preferably in the shape of a convex arc of a circular cylinder on the respective face of the intermediate plate.

The lock 50 for locking the swinging over is associated with the intermediate plate 30 and is cooperative with the movable plate 20. This lock is movable between an engaged position in which the movable plate 20 and intermediate plate 30 are coupled in rotation and a disengaged position in which the movable plate 20 and intermediate plate 30 are relatively uncoupled in rotation to allow a swinging over of the backrest and inversely. This lock 50 comprises at least one keeper 52 carried by the axial lateral wall 211 of the cavity 21 of the movable plate 20, and at least one bolt 53 cooperative with the keeper 52 and movably mounted on one of the faces 301, 302 of the intermediate plate 30 by guide means 530. The keeper 52 has the configuration of a crenellated notch of which the crenel is constituted by a recess 521 and the merlon is constituted by a stop 522 preferably in the shape of a concave arc of a circle. The bolt 53 has the configuration of a latch with a flank 530 preferably in the shape of a convex arc of a circle and a substantially radial shoulder 5301 cooperative with the recess 521 or the stop 522. These guide means 530 comprise a bearing surface 531 preferably in the shape of a concave arc of a circular cylinder on the bolt 53 and a pivot 532 preferably in the shape of a convex arc of a circular cylinder on the respective face of the intermediate plate.

As will become apparent hereinafter, the mechanism 40 and the lock 50 operate in their respective planes which are parallel and perpendicular to the axis of rotation Δ. In this way, the mechanism and the lock may be placed on the same side of a face of the intermediate plate or each of them is located on one side of an opposite face of the intermediate plate.

The movable control device 60 comprises at least two pairs of elements comprising a cam 61 and a counter-cam 62 the cam 61 having a profile 610 with a sole 6101 and an end portion 6102 and the counter-cam 62 having a bearing portion 621 and a recess 622 with a nose 623, and a shaft 63 capable of driving the cams 61. For reasons which will become apparent hereinafter, the sole and the bearing surface, on one hand, and the end portion and the nose, on the other hand, are adapted to cooperate with one another for the locked position or the unlocked position.

One of said pairs is adapted to act on the mechanism 40 and the other of said pairs is adapted to act on the lock 50. The cam 61 of a pair is preferably carried by a radial arm 611 mounted on the shaft 63, while the counter-cam 62 of this pair is carried by the toothed block 43 or by the bolt 53. If need be, studs or the like carried by the intermediate plate contribute to the guiding of the cams. As will be understood hereinafter, there are as many pairs of cam and counter-cam as there are, on one hand, bolts for the lock and, on the other hand, toothed blocks for the mechanism. The shaft 63 is coaxial with the axis Δ and is mounted on parts of the fixed and movable plates which act as a bearing or are capable of receiving a bearing. This shaft is apparent outside one of the fixed and movable plates at least for reasons which will become apparent hereinafter. Elastically yieldable biasing means 64 act on each of the cams 61 in such manner that each sole 6101 is normally in contact with the corresponding bearing surface 621 of the counter-cam 62 of the considered pair so as to tend to place and maintain the mechanism 40 and the lock 50 in the locked position by putting into engagement the toothed blocks and the teeth, on one hand, and the bolts and keepers, on the other hand. The elastically yieldable biasing means 64 comprise for example a spring of the type used for "clothes pegs", of which one branch is anchored in any suitable manner for example on the cam and the other branch is anchored in a similar manner on the intermediate plate.

The elastically yieldable biasing may be provided by a single spring or two distinct springs. If a single spring or two separate springs located on the same side of the intermediate plate are employed while the cams are placed on the opposite side of this plate, a branch must be provided on the spring and an opening must be provided in the intermediate plate through which this branch extends to be operative. The shapes given to a sole and a bearing surface of a pair are such that, under the effect of the elastically yieldable biasing means a substantially radial centrifugal force is developed.

The shaft 63 has two symmetrical flat faces 631 and the cam 61 has a central opening 612 in the shape of a sector with two symmetrical bearing surfaces 613 each adapted to cooperate with one of the flat faces 631 for reasons which will become apparent hereinafter. The bearing surfaces 613 have a "butterfly" or like configuration and preferably provide a clearance with the flat faces for reasons which will become apparent hereinafter.

Safety means 70 are provided by the stop 522 of the keeper 52 which is carried by the movable plate 20 and by a flank 530 of the bolt 53 which is carried by the intermediate plate 30. The safety means are adapted to immobilize the lock in the disengaged position as will be understood hereinafter.

The improved articulation according to the invention is in the form of a single unit which has the appearance of a case or a relatively flat and cylindrical barrel. The two plates are united for example by means of a ring which is set in position, welded or secured in any other conventional way for example to the fixed plate so that the other of said two plates and the intermediate plate are coaxially rotatable about the axis Δ defined by the guiding and centring arrangement which comprises the surface 120 and the edges 220 and 320.

All the foregoing is clearly illustrated in the Figures of the accompanying drawing to which reference may be made.

All the components of an articulation according to the invention are made for example of suitable metal and/or of suitable synthetic resin which are made in accordance with suitably adapted conventional techniques, such as blanking, stamping, punching, drilling, moulding . . . .

All the components of an articulation according to the invention are combined, mounted and assembled as will be clearly revealed by an examination of the Figures of the drawing.

The operation of the articulation according to the invention will now be explained.

It will be recalled that, in the conventional manner, the control device is provided with a lever with an actuating handle keyed on the shaft extending out of at least one of the fixed and movable plates, so that it is possible to turn this shaft preferably in either one of the two opposite directions. Such a lever with a handle is usually placed within reach of the occupant of the seat structure, most often on one side of the seat or under the latter in proximity to the front edge.

It will be assumed that, in the initial state, the mechanism for adjusting the inclination and the lock for locking the swinging motion are in the engaged positions in which the sole of the cam bears against the bearing surface of the counter-cam. It can then be seen that the fixed plate and the movable plate are consequently coupled with the intermediate plate. Under these conditions, the articulation is "rigid" since no rotation about the axis Δ is possible.

Figure 3A:
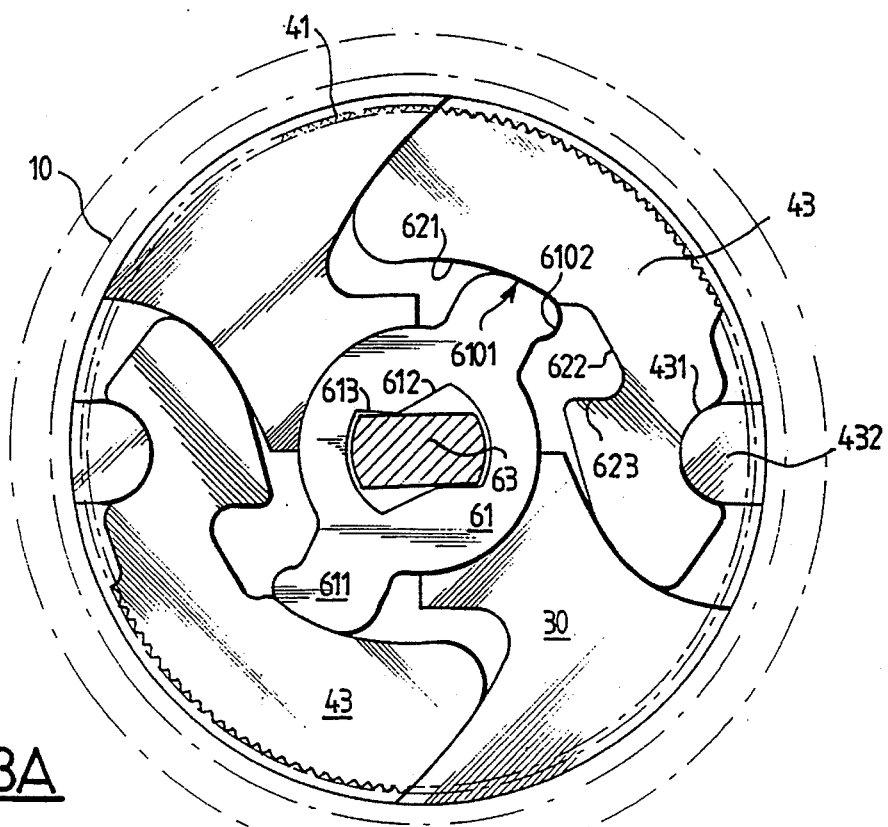
FIGS. 3A and 3B are simplified partial diagrammatic views of the mechanism for adjusting the inclination in its engaged position and its disengaged position respectively in order to explain the operation thereof.
Figure 3B:
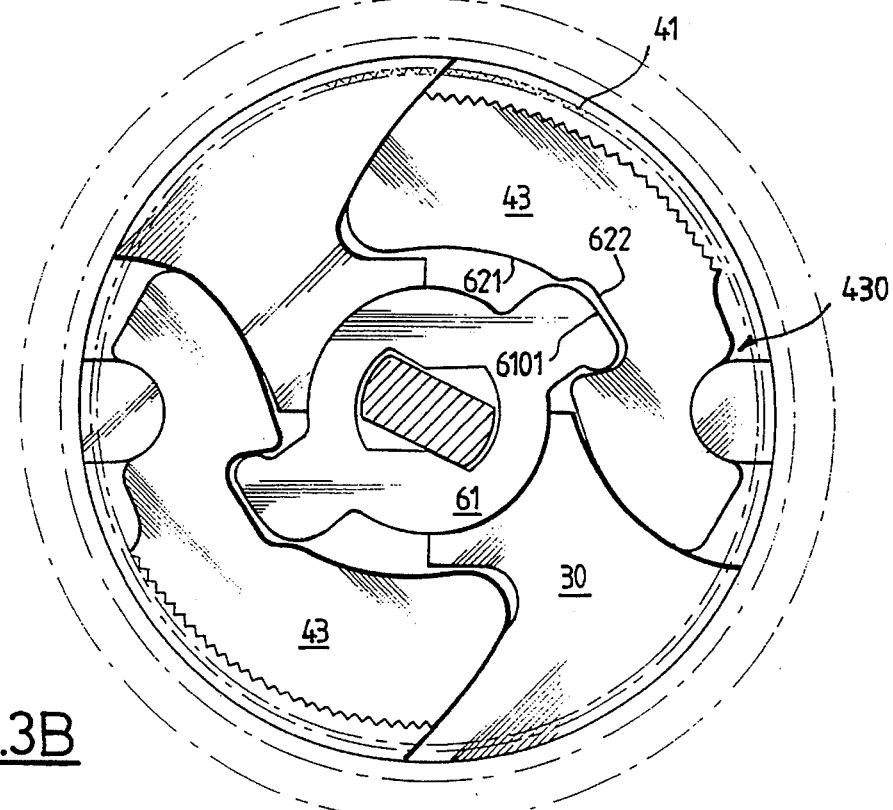

Now if one acts on the lever connected to the shaft in the suitable direction (in the clockwise direction as viewed in FIG. 3) against the action of the elastically yieldable biasing means, at least one of the flat faces of the shaft encounters at least one bearing surface of the opening of the cam, after the clearance has been taken up, and rotates it and thereby first of all separates its sole from the bearing surface and places it in alignment with the recess, then the end portion encounters the nose: the toothed block or blocks initially engaged with the teeth rapidly move away from the latter. The mechanism has been shifted from its engaged position to its disengaged position. The intermediate plate is uncoupled from the fixed plate but remains coupled with the movable plate. It will be observed in this respect that if the elastically yieldable biasing actions are performed by a single spring, owing to the mounting adopted for this spring, the force it exerts on the bolt or bolts increases which reinforces the engagement of the latter in the keeper and improves the engagement of the lock. It is therefore possible to modify the inclination of the backrest relative to the seat and impart the desired value thereto. Releasing the handle of the lever causes the blocks to return to their engagement with the teeth under the action of the cam biased by the elastically yieldable biasing means so that the mechanism resumes its engaged position. The articulation has resumed a "rigid" condition.

Figure 4A:
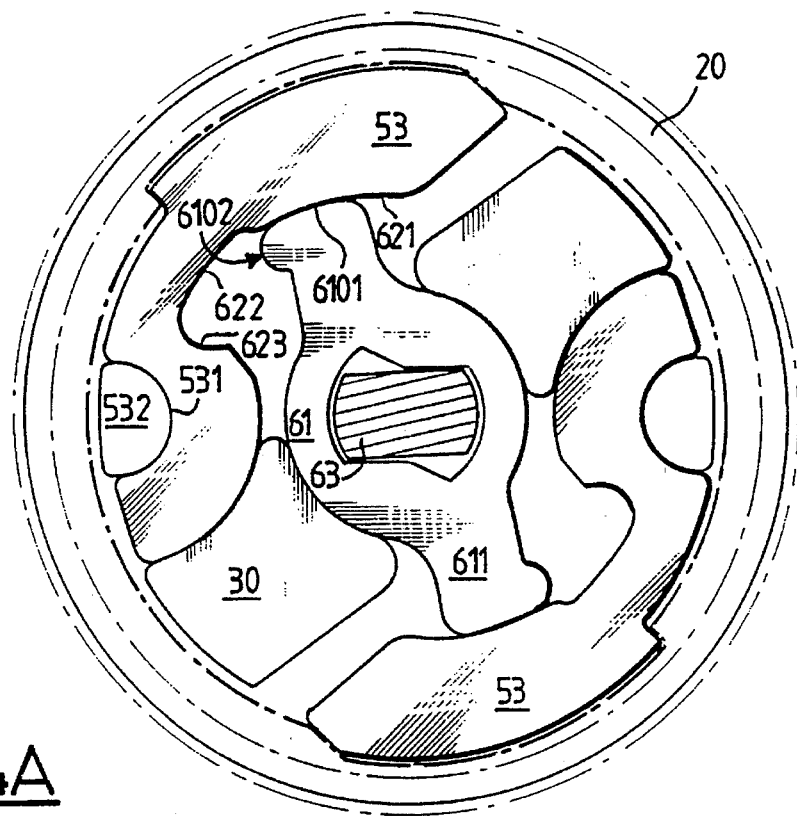
FIGS. 4A and 4B are views similar to those of FIGS. 3A and 3B illustrating the swing locking lock in the two positions thereof.
Figure 4B:
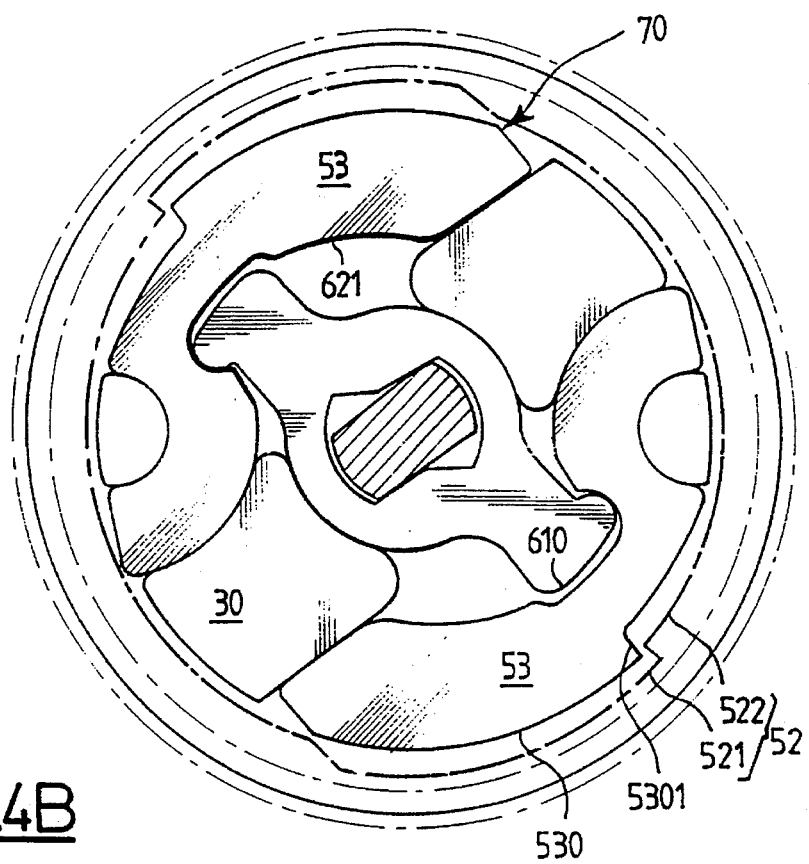

If one now acts on the lever connected to the shaft in the opposite direction (counterclockwise direction as viewed in FIG. 4), it is at least another of the flat faces of the shaft which encounters at least one corresponding bearing surface of the opening of the other cam, after clearance has been taken up, and causes it to rotate and first of all causes the sole to move away from the bearing surface so as to place it in alignment with the recess and then the end portion encounters the nose: the bolt or bolts of the lock initially engaged with the keeper rapidly moves away from the keeper. The lock has been shifted from its engaged position to its disengaged position. The intermediate plate is uncoupled from the movable plate but remains coupled with the fixed plate. What was previously explained with respect to the force developed by the elastically yieldable means now also applies to the mechanism. It is therefore possible to swing over the backrest toward the seat. It will be observed that, in the course of this operation, the safety means perform their function since the flank of the bolt remains in facing relation to the stop of the keeper and slides against it and prevents it from returning to the position of engagement with the latter: in this way the lock remains immobilized in the disengaged position. Owing to the presence and the action of the safety means, it is unnecessary to permanently act on the handle of the control device lever. To raise the backrest, it is sufficient to swing it over in the opposite direction: it then resumes in a sure manner its initial inclination, since the latter is determined by the position of the bolt carried by the intermediate plate which remained coupled with the fixed plate. If need be, the return to the raised position of the backrest is achieved by or aided by a special compensating spring associated with the seat structure in the known manner.

It will also be observed that, in the course of the swinging over or of the raising of the backrest and when the lever connected to the shaft is left free, the flat face or faces on the shaft opposed to that or those which were used for the manoeuvre for disengaging the lock under the action of the elastically yieldable biasing means are in, or come into, contact with the corresponding bearing surface or bearing surfaces of the opening of the cam of the lock whose sole is trapped in the recess in the counter-cam of the bolt the flank of which is itself maintained applied against the stop of the keeper. Owing to such a kinematic chain, the safety means renders impossible any unlocking of the inclination adjusting mechanism by an intentional or accidental actuation of the lever connected to the shaft, the latter being unable to rotate in the opposite direction through a sufficient angle to allow the disengagement of the toothed blocks from the teeth of the fixed plate. The memory of the position of adjustment of the inclination of the backrest is therefore always safeguarded.

Note, on the other hand, that with such a kinematic chain, when the shaft occupies its normal position of rest in which it is maintained in any suitable manner, it is possible to act on the inclination adjusting mechanism without hindering the swing locking lock or, inversely, it is possible to act on the swing locking lock without hindering the mechanism adjusting the inclination.

In the foregoing it was assumed that a single control device which operates in two opposite directions is used. It is clear that it is also possible to employ a multiple control device, for example a double control device, one for adjusting the inclination and the other for the swinging over. In such a case, as is known, the actuating handle is doubled and that intended for the swinging over is for example located on the outer lateral side of the backrest. It is then sufficient to employ a suitable linkage which is rigid, articulated or flexible of any suitable type which connects the actuating handle to the shaft of the movable control device or to the suitable cam.

It was assumed that a single articulation according to the invention is employed per seat structure. It is clear that it is possible to employ two articulations per seat structure, one being located on each side. In this case, it is then necessary for the control device to act simultaneously on the two articulations. To this end, it is for example sufficient to extend the shaft in such manner as to extend transversely from one side to the other of the seat structure. Further, if the control device is double instead of being single with two opposite directions of operation, it can be arranged to be coaxial with the axis A.

Owing to its modular design, an articulation according to the invention is also suitable for the case where there is no need to swing the seat structure over, since it is sufficient for this purpose to avoid mounting the lock and to render the intermediate plate and one of the other two plates connected in rotation by any suitable means.

In the foregoing, it was assumed that the mechanism had two diametrically opposed toothed blocks and that the lock likewise had two diametrically opposed bolts and two keepers.

It is clear that the number of blocks and bolt-keeper assemblies may be different from each another and that the situation of the blocks and bolt-keeper assemblies may be modified.

In the foregoing, it was assumed that the blocks of the adjusting mechanism and the bolts of the lock undergo swinging motions. It is clear that, by using suitably adapted guides, the toothed block or blocks and the bolt or bolts may have rectilinear motions.

It will be observed that the control device including a cam and a counter-cam affords a "positive" connection for achieving the locked position and for achieving the unlocked position, since it is either the sole or the end portion of the cam which acts, either on the bearing surface or on the nose of the counter-cam, respectively.

In the foregoing specification, it was assumed that it is the fixed plate which carries the inner teeth and which ensures the rotational guiding of the intermediate plate and movable plate. It is clear that these functions may be inverted between the fixed plate and the movable plate. The same is true of the fixed plate and the movable plate which may be reversed, it being possible to mount either one indifferently on the backrest or on the seat. In the illustrated embodiment, it was assumed that it is the fixed plate which is mounted on the seat and it is the movable plate which is mounted on the backrest.

In the foregoing specification, it was assumed that it is the fixed plate which is provided with a guiding and centring surface which may be stepped or otherwise, which cooperates with the edges of the movable plate and of the intermediate plate to form the guiding and centring arrangement. It is clear that any other arrangement may be adopted; it is sufficient for one of the plates to act as reference or locating means for the other two plates to define the axis of rotation.

In the foregoing specification, it was assumed that the toothed blocks of the mechanism for adjusting the inclination were mounted on the intermediate plate and that the teeth for the blocks were carried by the fixed plate; it is clear that the opposite arrangement may be adopted. The same is true of the bolts and keepers of the lock which, instead of being respectively mounted on the intermediate plate and carried by the movable plate may be arranged in the reverse manner. It will be noted that it is also possible to employ partly the illustrated arrangement and partly the arrangement opposite to the latter.

The fixing means comprise for example tapped studs set in apertures provided in the inner walls of the fixed plate and of the movable plate around the central passage. It is clear that any other technique may be employed and that instead of such studs or the like, dogs or the like may be employed to immobilize in rotation the fixed plate and movable plate on the backrest and seat. All this is conventional and the solution adopted is chosen in accordance with the required specifications for ensuring in particular interchangeability.

The foregoing clearly shows the distinctive features, the interest and the advantages of the invention.

What is claimed is:

1. An articulation having a memory of an inclination adjustment position of a seat structure comprising a seat and a backrest which are relatively rotatively movable about an axis defined by a guiding arrangement of the articulation, whereby it is possible, either to progressively incline the backrest relative to the seat, or to swing over the backrest toward the seat, said articulation comprising:

a fixed plate with a first cavity for fixing to one of said seat and backrest;

a movable plate with a second cavity for fixing to the other of said seat and backrest, wherein said first and second cavities together define an inner chamber;

an intermediate plate which is placed in said chamber in such a manner as to be rotatable about said axis;

an inclination adjusting mechanism which is associated with said intermediate plate, which is cooperative with said fixed plate, and which is movable between an engaged position, in which said fixed and intermediate plates are coupled in rotation, and a disengaged position in which said fixed and intermediate plates are relatively uncoupled in rotation to allow an adjustment of the inclination;

a lock for preventing the backrest from swinging over toward the seat and inversely, said lock being associated with said intermediate plate, being cooperative with said movable plate, and being movable between an engaged position, in which said movable and intermediate plates are coupled in rotation, and a disengaged position in which said movable and intermediate plates are relatively uncoupled in rotation to allow the backrest to swing over toward the seat; and a movable control device capable of acting on said mechanism and said lock in such a manner as, at will, to cause either one of said mechanism and said lock to pass from its engaged position to its disengaged position, whereby the intermediate plate is coupled with both said fixed and movable plates or is coupled with only one or the other of said fixed and movable plates, the intermediate plate being a plate with two opposite faces, said first cavity being defined by an axially extending first peripheral wall carrying teeth, and said second cavity being defined by an axially extending second peripheral wall;

said mechanism comprising at least one toothed block which is cooperative with said teeth carried by said first peripheral wall, and which is mounted on one of said two opposite faces by first guide means carried by said one opposite face;

said lock comprising at least one bearing plate which is cooperative with a keeper carried by said second peripheral wall, and which is mounted on the other of said two opposite faces, by second guide means carried by said other opposite face.

2. The articulation according to claim 1, wherein said toothed block and said bearing plate are pivotally mounted on said first and second guide means, respectively.

3. The articulation according to claim 1, wherein the first guide means comprises a bearing surface on said toothed block, and a pivot on said intermediate plate.

4. The articulation according to claim 1, wherein said second guide means comprises a bearing surface on the bearing plate and a pivot on said intermediate plate.

5. The articulation according to claim 1, wherein the movable control device comprises: at least two pairs of elements comprising a cam and a counter-cam, said cam having a profile with a first bearing surface and a first end portion, and the counter-cam having a second bearing surface adapted to cooperate with the first bearing surface, a recess and a second end portion adapted to cooperate with the first end portion, a shaft for driving the cam and counter-cam; and elastically yieldable means acting on each of said cam and counter-cam, one of said pairs of elements being operative on said mechanism, and the other of said pairs acting on the lock.

6. The articulation according to claim 5, wherein said cam is carried by a radial arm mounted on the shaft, and said counter-cam is carried by one of said toothed block and said bearing plate.

7. The articulation according to claim 5, wherein the shaft has two symmetrical flat faces, and the cam has a central opening defining two symmetrical bearing surfaces each cooperative with one of said flat surfaces.

8. The articulation according to claim 1, wherein said guiding arrangement comprises: a circular cylindrical guide surface on the fixed plate; and, cooperative with said guide surface, a circular cylindrical peripheral edge of the movable plate, and a circular cylindrical peripheral edge of the intermediate plate.

9. The articulation according to claim 1, wherein the keeper is defined in the second peripheral wall by a recess and a stop in the shape of a concave arc of a circle, and the bearing plate has a flank defined by a convex arc of a circle.

10. The articulation means according to claim 1, further comprising safety means for immobilizing the lock in the disengaged position when the backrest is swung over toward the seat.

11. The articulation according to claim 10, wherein the keeper is defined in the second peripheral wall by a recess and a stop in the shape of a concave arc of a circle, and the bearing plate has a flank defined by a convex arc of a circle, said stop operatively engaging with said flank constitutes the safety means.

* * * * *